W. K. RAIRIGH.
Harvesters.

No. 139,612.

2 Sheets--Sheet 2.

Patented June 3, 1873.

Witnesses:
G. Mattrys
C. A. Pettit

Inventor:
Wm K. Rairigh
per
Attorneys.

UNITED STATES PATENT OFFICE.

WILLIAM K. RAIRIGH, OF PLUMVILLE, PENNSYLVANIA.

IMPROVEMENT IN HARVESTERS.

Specification forming part of Letters Patent No. 139,612, dated June 3, 1873; application filed August 23, 1873.

*To all whom it may concern:*

Be it known that I, WILLIAM K. RAIRIGH, of Plumville, in the county of Indiana and State of Pennsylvania, have invented certain Improvements in Harvesters, of which the following is a specification:

The invention consists in certain improvements upon harvesters, which will be first fully described and then clearly pointed out in the claims.

Figure 1:
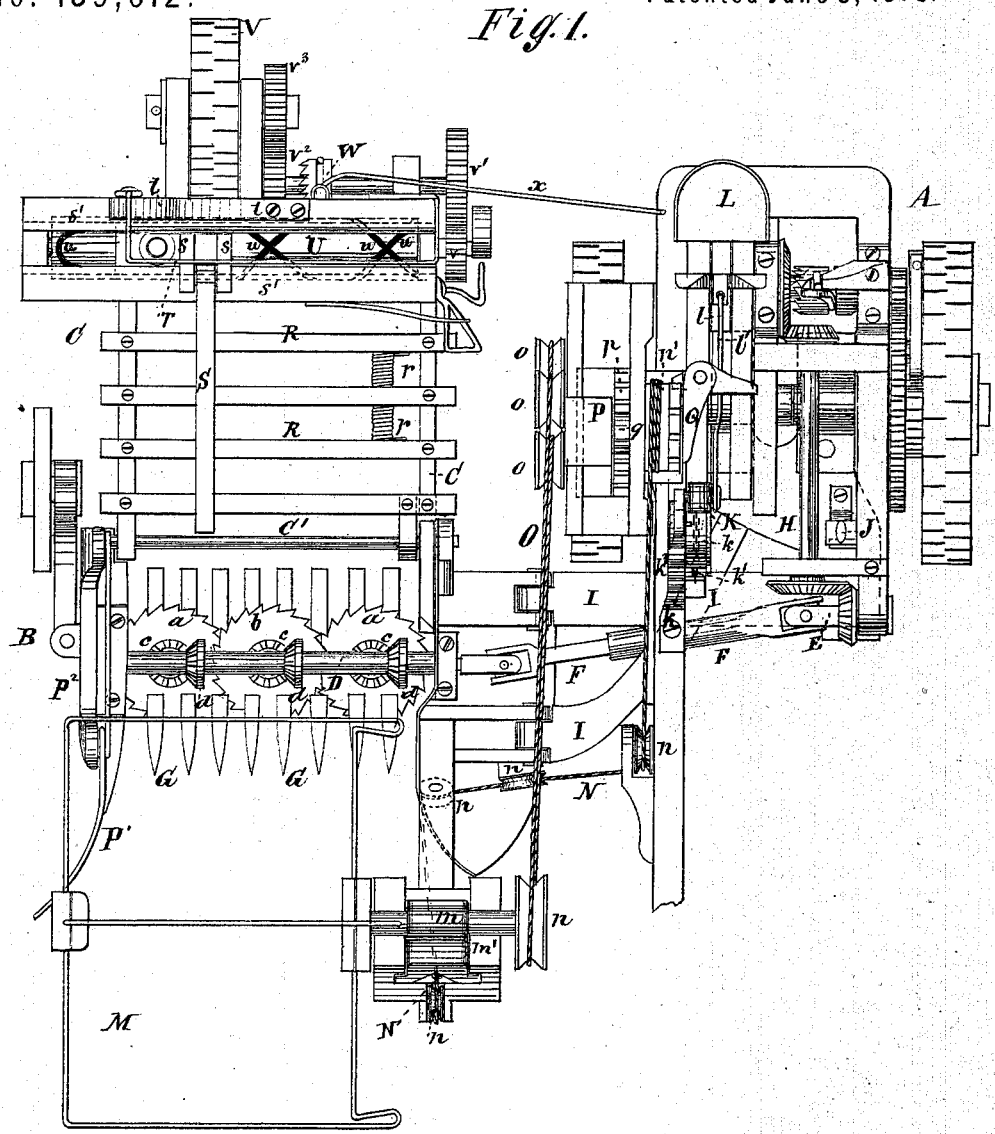
Figure 2:
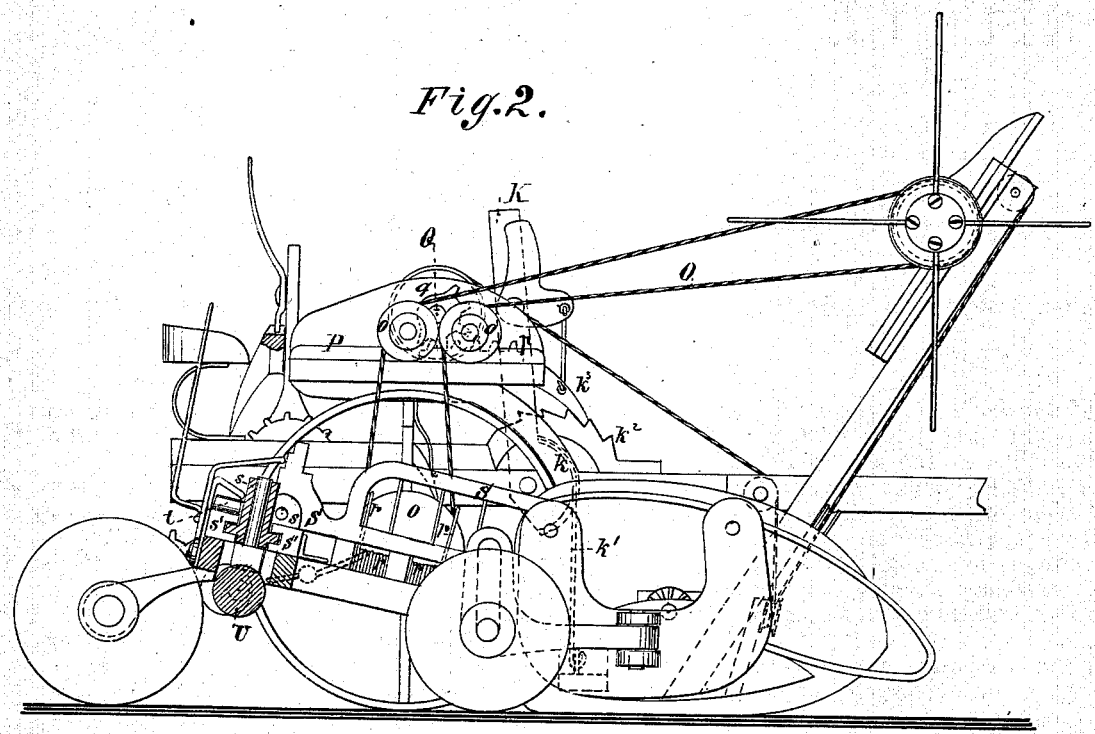
Figure 3:
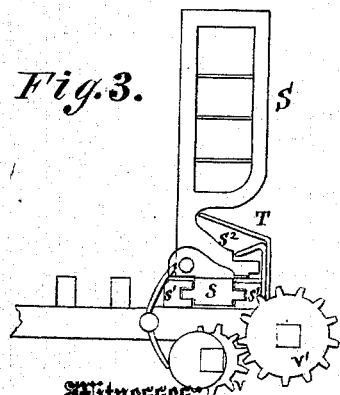

In the drawings, Figure 1 is a top view. Fig. 2 is a side elevation. Fig. 3 is an elevation of the rake.

A in the drawing represents the carriage; B, the cutter-frame pivoted thereto; and C, the rake-frame pivoted to the cutter-frame. M is the reel, journaled in the bearing-block $m$, which slides in the grooved upright $m'$. To this block is attached a cord, N, which passes over pulleys $n\ n\ n\ n$ and is fastened to drum $n'$. O is a cord that passes over pulleys $o\ o\ o\ o$, of which the latter is on the axle and operates the reel, while the two middle ones are on the sliding block P. This block P has a rack, $p$, which gears with sectional pinion $q$ on the hand-crank shaft Q. By turning this crank-shaft the driver causes the reel to be adjusted, while, at the same time, he correspondingly moves the two middle tension-pulleys $o\ o$ on sliding block P. P¹ is an open-wire gatherer that extends high enough to prevent the grain from falling over the side, and is attached to the detachable guide-frame P². The rake-frame C is connected and pivoted to the cutter-frame by a long bolt, C′, which may be readily removed, and allows the former to be detached when not needed, as in cutting grass. Across the rake-frame are placed at intervals the slats R, and between two or more of them are located the spring-uprights $r$ at a short distance from the ends where the gavel is discharged. S is the rake, pivoted in a block, $s$, that slides between the grooved guides $s^1\ s^1$. The rake has a projection, $s^2$, recessed to receive the rod T, which holds the rake in an upright position until it is passed. $t$ is a flat spring, which is compressed by the projection $s^2$, and, as soon as the rake has passed the rod T, throws it over upon the slats R and into position for performing its function. U is a shaft which has two longitudinal spiral slots, $u\ u$, that cross each other and receive a stud extending down from the sliding block of rake. This stud is carried forward in one slot and back in the other, whereby the rake is reciprocated across the slat-platform R. This cam-slotted shaft is connected with wheel V by the train of cog-wheels $v\ v^1\ v^2\ v^3$. W is a clutch movable by a lever, $x$, to stop or set in motion the rake.

Having thus described my invention, what I claim as new, and desire to secure by Letters Patent, is—

1. The sliding reel-block $m$, the racked and sliding pulley-block P, and the hand crank-shaft Q having pinion and drum thereon combined with cords and pulleys, as and for the purpose specified.

2. A pivoted sliding rake, S, having projection $s^2$ that is held by rod T and acted upon by spring $t$, substantially as and for the purpose specified.

WM. K. RAIRIGH.

Witnesses:
SOLON C. KEMON,
CHAS. A. PETTIT.